UNITED STATES PATENT OFFICE.

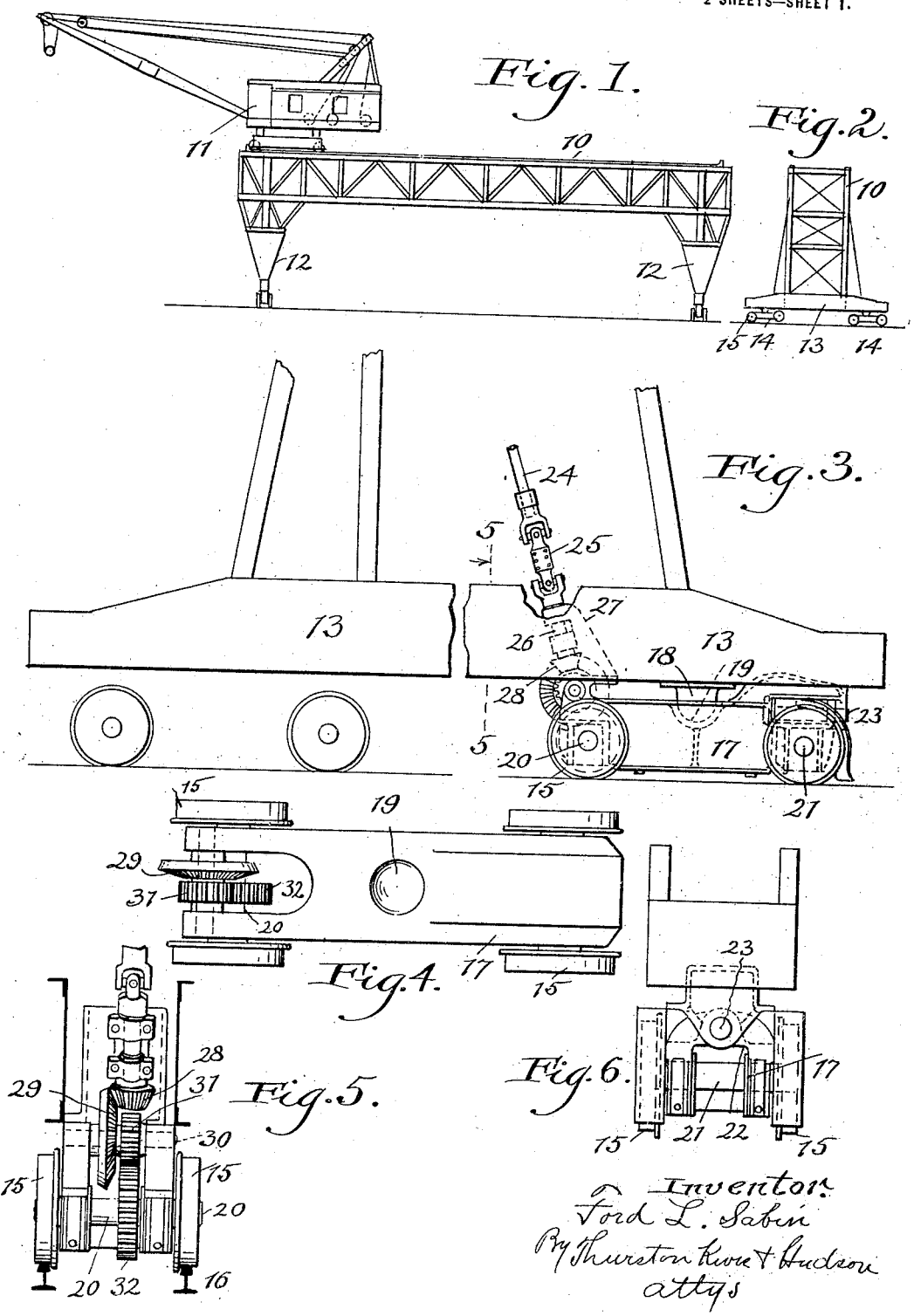

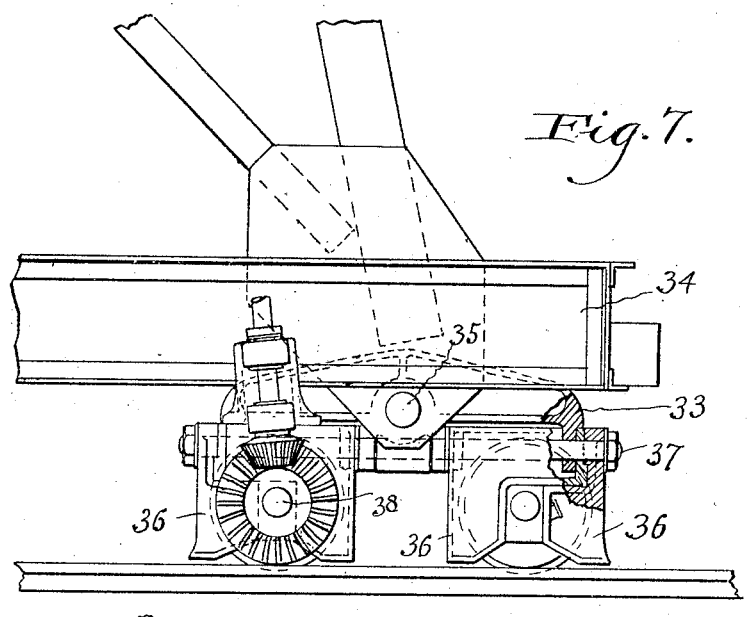
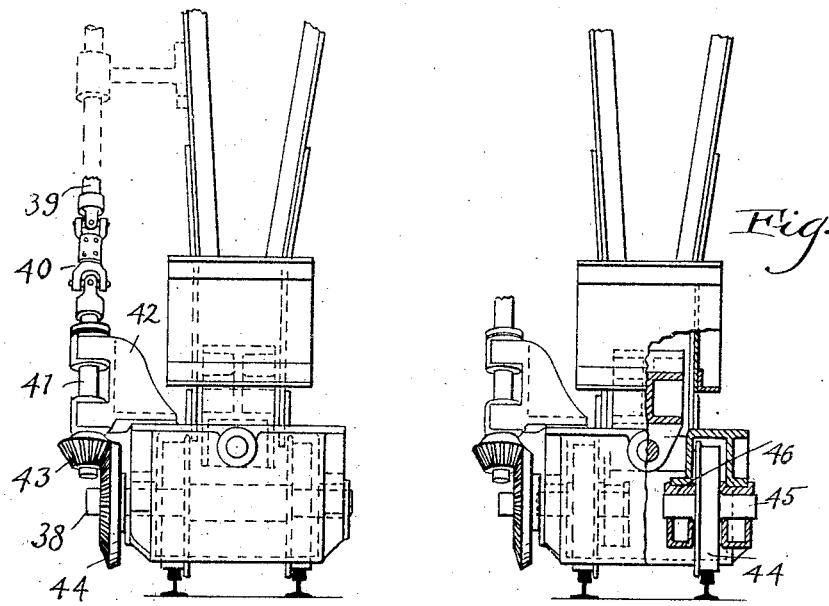

FORD L. SABIN, OF CLEVELAND HEIGHTS, OHIO, ASSIGNOR TO THE WELLMAN-SEAVER-MORGAN COMPANY, OF CLEVELAND, OHIO, A CORPORATION OF OHIO.

COMPENSATING TRUCK FOR CRANES.

1,368,356.  Specification of Letters Patent.  Patented Feb. 15, 1921.

Application filed April 18, 1919. Serial No. 291,037.

*To all whom it may concern:*

Be it known that I, FORD L. SABIN, a citizen of the United States, residing at Cleveland Heights, in the county of Cuyahoga and State of Ohio, have invented a certain new and useful Improvement in Compensating Trucks for Cranes, of which the following is a full, clear, and exact description.

This invention relates to compensating trucks for cranes, and has particular reference to four-wheel trucks which run upon parallel track rails.

The principal object of the invention is to provide a truck construction such that irregularities transversely and longitudinally of the track rails are compensated for in such a manner that the four wheels of the truck will at all times bear equal parts of the load while at the same time there is eliminated twisting or torsional stresses in the frame, and there is likewise prevented relative movement between the gears which drive the truck, when this compensation takes place.

The invention may be briefly summarized as consisting in certain novel details of construction, and combinations and arrangements of parts which will be described in the specification and set forth in the appended claims.

My improved truck may be utilized to advantage on any type of traveling crane, such as the so-called gauntree type, though it is to be understood that I am not to be limited to trucks for this type of crane.

In the accompanying sheets of drawings, Figures 1 and 2 are respectively a side and end view on a small scale, of a gauntree crane adapted to be equipped with my invention; Fig. 3 is a side view on a relatively large scale, showing one of the truck sills provided with two four-wheel trucks embodying my invention; Fig. 4 is a plan view of the truck casting or main frame of the truck; Fig. 5 is a sectional view substantially along the line 5—5 of Fig. 3, looking in the direction indicated by the arrow; Fig. 6 is a rear end view of the same; Fig. 7 is a side view of part of a truck wheel showing a modified form of truck; Fig. 8 is an end view of the same; and Fig. 9 is a similar view showing a slight modification.

Referring now to the drawings, 10 represents the bridge of the crane over which is adapted to run suitable hoisting mechanism 11, the bridge being provided at its ends with legs 12 having at the bottom sills 13, each of which in this case is supported on two four-wheel trucks 14, said trucks having wheels 15 which are designed to run on adjacent parallel track rails 16.

In accordance with the form of the invention shown in Figs. 3 to 6, each truck includes a main frame or casting 17, which at the center has a ball and socket connection with the sill, the latter in this instance having the equivalent of a ball 18, and the casting 17 having a spherical socket 19, which receives the part 18. With this construction, one axle 20 carrying one pair of wheels 15 has bearings in the main casting 17, which allow no relative movement with respect to the casting 17, except, of course, rotary movement, that is to say, there is no compensating movement between this axle and the truck casting. The other axle 21 is differently mounted, since it has bearings in a frame 22, (see particularly Fig. 6) pivoted by a longitudinally extending pin 23 to one end of the truck frame or casting 17. It will be observed that though the front axle is rigid as far as compensating movement is concerned with reference to the truck frame, nevertheless, by reason of the ball and socket connection between the sill and truck frame or casting, and by reason of the fact that the axle carrying the other pair of wheels is pivoted on an axis so as to swing transversely, complete compensation can take place for both longitudinal and transverse irregularities of the two track rails 16, so that all four wheels bear equal parts of the load supported by the truck as a whole, regardless of track irregularities.

In order that the compensating benefit may be taken advantage of, it is highly desirable, if not essential, that while the compensations take place, there be no dis-alinement of the gears which transmit movement to, or drive the truck. In this instance there is employed a drive shaft 24, which through universal coupling members, indicated as a whole by the reference character 25, drives a lower shaft section 26 supported in bearings 27 secured to and rigid with the truck frame or casting 17. In this instance the lower end of the lower shaft section 26 is provided with a bevel pinion 28, driving a bevel gear 29 mounted on a countershaft 30, supported in bearings fixed to or integral with the truck frame or casting, this countershaft being provided with a spur pinion 31, which drives a spur gear 32 secured to the axle 20. With this construction the upper shaft section 24 will have bearings secured to the leg 12 of the crane, and inasmuch as the lower shaft section 26 has bearings secured to the truck frame or casting, the two shaft sections 24 and 26 may move relatively through the provision of the universal coupling 25, while the compensation takes place, but nevertheless, none of the four gears are dis-alined. That is to say, while the compensation takes place there is no relative movement between the gears 28, 29, 31 and 32 aside from the normal rotary movement.

It will be understood that with this construction the shaft 24 will extend up to the bridge of the crane where it will have suitable driving connection with a motor or other source of power utilized in operating the other parts of the crane.

As will be obvious from the construction next to be described, it is not essential that the axle bearings be on the inside of the track wheels, or that the driving gears be between the track wheels as shown in Figs. 3, 4 and 5.

In Figs. 7, 8 and 9 I have shown a construction wherein substantially the same results as before described are obtained without a ball and socket connection between the truck casting and the sill. In this instance the truck casting which is designated by the reference character 33, is connected to the sill 34 by a transverse pivoting pin 35 which extends through the center of the truck casting, but in this construction neither of the axles has bearings rigidly mounted with respect to the truck casting, but each is supported in an axle frame 36 pivoted to the casting 33 on an axis to swing transversely. In this case this pivotal connection between the axle frames and the truck frame or casting is obtained by a single shaft 37 which extends longitudinally of the truck from one end of the casting 33 to the other. Thus due to the transverse pivoting pin 35, the truck as a whole can compensate for irregularities lengthwise of the two track rails, and due to the longitudinal pivoting pin or shaft 37, either axle frame and axle can rock so as to compensate for transverse irregularities. In consequence, all four wheels of the truck will, as in the first instance, bear equal parts of the load.

With this construction, one of the axles, here designated 38, has a driving connection with a shaft in substantially the manner previously described, that is to say, the upper section 39 of the shaft is connected through a universal joint 40 to a lower shaft section 41, which in this instance has a bearing 42 on the corresponding truck frame instead of on the truck casting as in the first instance. Instead of this shaft driving an inside gear, as in the construction first described, it drives an outside gear, the lower shaft section 41 having a bevel pinion 43 which engages a bevel gear 44 mounted directly on the axle 38. With this construction, if desired, a series of gears such as shown in the first construction could be utilized, i. e. the driving shaft through a suitable train could drive a gear fixed to the axle between the track wheels, and the construction shown in Figs. 7, 8 and 9 make it clear that similar outside gearing could be utilized with the first described construction.

In Figs. 7 and 8 the axle bearings are on the outside of the track wheels, but this is not an essential feature of this construction as they could be on the inside as in Figs. 3 to 6, and it is equally obvious that in the construction shown in Figs. 3 to 6 the bearings could be on the outside of the track wheels.

The construction shown in Fig. 9 is similar to that shown in Figs. 7 and 8 with the exception that one pair of wheels, here designated 44, (the pair of wheels other than the pair mounted on the gear driven axle, whether they be the front pair or rear pair) are mounted on separate short axles 45, having inside and outside bearings 46. The other axle will, of course, be continuous, i. e. connected to both wheels since they constitute the traction wheels that are driven by the gears, and this axle may have bearings on the inside and outside of the wheels substantially as shown in Fig. 9. From this it is obvious that axle bearings may be provided for all wheels, inside of the wheels, outside of the wheels, or on both the inside and outside of the wheels.

In the drawings, driving power is transmitted to simply one of the trucks connected to the sill, but if desired, both trucks could be driven, in which event the shaft sections, gearing, etc., shown for the rear truck of Fig. 3 would be dulpicated for the front truck. The same is true, of course, with any of the modified forms of trucks shown.

I have previously stated in the early part of the specification that this invention is not limited to cranes of the gauntree type having the downward extending legs 12 at the ends of the bridge, but that the invention could be utilized with other types of traveling cranes. I therefore do not desire to limit the invention to a construction wherein the truck is connected to a sill, and in the claims, the words "crane structure" is intended to cover the bridge itself, or any part rigid therewith, and with which the truck may be connected.

Having described my invention, I claim:

1. In a crane, a crane structure, means comprising a four-wheel truck for supporting the same and including a truck frame movably connected at its middle point to the crane structure so that the truck frame may swing in at least one direction with respect to the crane structure, and said truck including also two pairs of axle-mounted wheels, at least one of said pairs being mounted in an axle frame movably connected at its middle point to the truck frame so that said frame may swing relatively to the truck frame transversely of the track rails, means comprising a pair of gears and a shaft section connected to one of the same for propelling the truck, and means for supporting said gears so that they will be held in alinement during compensation for track irregularities in any direction.

2. In a structure adapted to be moved along a track, a main frame, means comprising a plurality of four-wheeled trucks for supporting the same, each including a truck frame movably connected at its middle point to the main frame so that the truck frame may swing in at least one direction with respect to the main frame, and each truck also including two pairs of axle mounted wheels at least one of said pairs being mounted in an axle frame movably connected to the truck frame so that it may swing relatively to the truck frame transversely of the track rails, one or more of said trucks having propelling means comprising a pair of gears, a shaft section connected to one of the same, and bearings on the truck frame supporting said shaft section and one of the gears.

In testimony whereof, I hereunto affix my signature.

FORD L. SABIN.